United States Patent [19]

Botros et al.

[11] 4,234,483
[45] Nov. 18, 1980

[54] N-(3-CHLORO-4-[2,6-DICHLORO-4-NITROPHENYL)AZO]-2-METHYL PHENYL)-β-ALANINE, METHYL ESTER

[75] Inventors: Raouf Botros, Beech Creek; Ivan E. Riggle, Lock Haven, both of Pa.

[73] Assignee: American Color & Chemical Corporation, Charlotte, N.C.

[21] Appl. No.: 713,619

[22] Filed: Aug. 11, 1976

[51] Int. Cl.$^3$ .................. C09B 29/08; D06P 3/04; D06P 3/24; D06P 3/52
[52] U.S. Cl. .................. 260/207.1; 260/196; 260/207; 560/47; 562/456
[58] Field of Search .................. 260/207, 207.1, 196

[56] References Cited

U.S. PATENT DOCUMENTS

| | | | |
|---|---|---|---|
| 2,314,400 | 3/1943 | Bock et al. | 260/207.1 X |
| 3,528,961 | 9/1970 | Miles et al. | 260/162 |

FOREIGN PATENT DOCUMENTS

| | | | |
|---|---|---|---|
| 1409393 | 7/1965 | France | 260/207.1 |
| 957419 | 5/1964 | United Kingdom | 260/207.1 |

*Primary Examiner*—Floyd D. Higel
*Attorney, Agent, or Firm*—Armstrong, Nikaido, Marmelstein & Kubovcik

[57] ABSTRACT

Azo compounds of the formula:

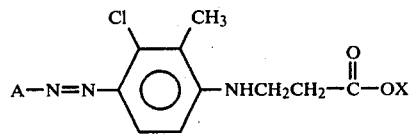

are provided where A is a diazotizable aromatic hydrocarbon and X is hydrogen or lower alkyl. The compounds dye synthetic fibers, particularly nylon and polyester, and wool in strong yellow to red hues of outstanding brightness and build-up. The dyeings have excellent fastness properties.

1 Claim, No Drawings

N-(3-CHLORO-4-[2,6-DICHLORO-4-NITRO-PHENYL)AZO]-2-METHYL PHENYL)-β-ALANINE, METHYL ESTER

BACKGROUND OF THE INVENTION

1. Field of the Invention

The present invention relates to azo dyes useful in the dyeing of natural and synthetic fibers; particularly, wool and aromatic polyester, nylon and acetate fibers. More particularly, the invention relates to azo dyes prepared from, as a coupling component, a 3-chloro-2-methylaniline derivative.

2. Description of the Prior Art

Monoazo dyes derived from, as a coupling component, N-carboxyalkyl- or N-carboalkoxyalkylanilines are widely disclosed as dyes for both natural and synthetic fibers.

Dickey et al, U.S. Pat. No. 2,470,094, discloses monoazo dyes of the formula

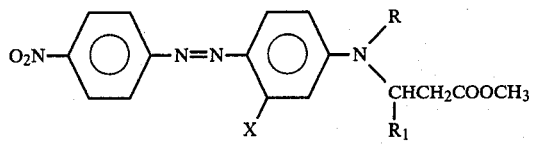

wherein R is hydroxyalkyl, —CH$_2$CH$_2$COOCH$_3$ or —CH(CH$_3$)CH$_2$COOCH$_3$; R$_1$ is hydrogen or methyl and X is hydrogen, methyl, ethyl or halogen, as being useful in the dyeing of nylon and vinyl acetatevinyl chloride copolymers.

McNally et al, U.S. Pat. No. 2,373,700, discloses azo compounds of the general formula:

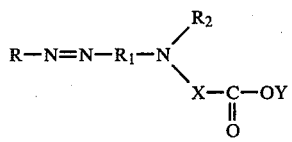

wherein R is the residue of a diazotizable amine; R$_1$ is a benzene or naphthalene nucleus optionally substituted with substituents including methoxy, hydroxy, halogen and alkyl; R$_2$ is hydrogen, an aliphatic group, a cycloalkyl group, a furyl group, a phenyl nucleus or

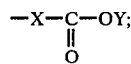

X is a short chain saturated aliphatic hydrocarbon and Y is an aliphatic group, furyl or phenyl. The compounds are stated to possess application for the coloration of organic derivatives of cellulose, silk and wool.

Dickey et al, U.S. Pat. No. 2,723,264, discloses that azo compounds of the general formula:

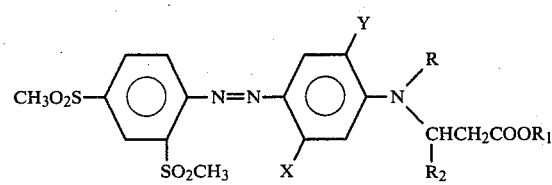

wherein R is hydroxyalkyl having 2–3 carbon atoms; R$_1$ is CH$_3$, —CH$_2$CH$_3$ or —CH$_2$CH$_2$OH; R$_2$ is H or —CH$_3$; X is H, Cl, Br or —CH$_3$ and Y is —OCH$_3$, —OCH$_2$CH$_3$ or —OCH$_2$CH$_2$OH, are particularly useful for the coloration of cellulose acetate textile materials.

In Fishwick et al, U.S. Pat. No. 3,097,198, it is disclosed that textile materials comprising artificial fibers, for example, cellulose acetate rayon, cellulose triacetate and polyester fibers, may be dyed in orange to blue shades possessing good fastness to light, washing and dry heat treatments using water-insoluble azo dyes of the formula:

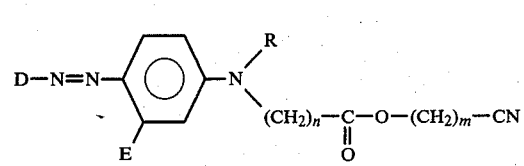

where D is benzene, thiazole or benzothiazole which may be substituted with NO$_2$, —CN, —SCN, —CF$_3$, methylsulfonyl or chloro; R is lower alkyl, aralkyl group or

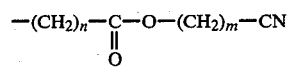

with m and n being 1 or 2, and E is hydrogen, lower alkyl or chloro.

Kruckenberg, U.S. Pat. No. 3,406,165 similarly discloses monoazo dyes for the dyeing of artificial fibers of aromatic polyester, polyamide, cellulose ester and the like. The dyes are azo compounds of the formula:

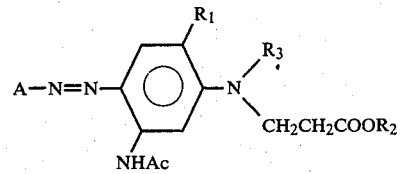

wherein A is one of the radicals

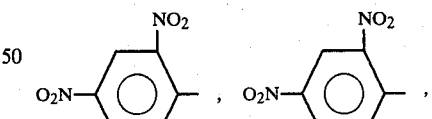

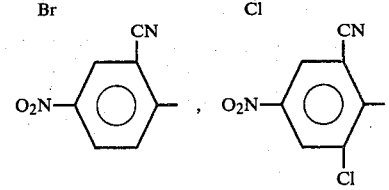

or 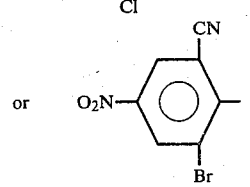, and $R_1$ is hydrogen, methoxy, ethoxy or chloro; $R_2$ is $C_nH_{2n-1}$; $R_3$ is hydrogen, —CH$_2$CH$_2$CN, —CH$_2$CH$_2$COOC$_n$H$_{2n+1}$ or $C_nH_{2n+1}$ with n being an integer of from 1 to 5, and Ac is unsubstituted lower aliphatic carbonyl of 2-3 carbon atoms, chloro substituted lower aliphatic carbonyl of 2-3 carbon atoms, cyano substituted lower aliphatic carbonyl of 2-3 carbon atoms, hydroxy substituted lower aliphatic carbonyl of 2-3 carbon atoms, methoxy carbonyl, amino carbonyl and methylamino carbonyl.

British Pat. No. 491,793 discloses azo dyes suitable for dyeing cellulose esters and ether and which are prepared by coupling diazotized aromatic amines free from sulfonic acid groups with N-arylamino carboxylic acids of the general formula:

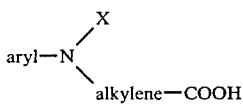

Fishwick, U.S. Pat. No. 3,637,652 claims disperse monoazo dyes of the formula:

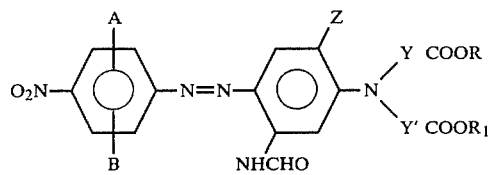

wherein A and B are each independently hydrogen, nitro or halogen; Y and Y' are each independently lower alkylene radicals; R is lower alkyl; R$_1$ is hydrogen and lower alkyl and Z is hydrogen, lower alkyl and lower alkoxyl.

Sumner et al, U.S. Pat. No. 3,961,881, discloses a process for coloring synthetic polyamide employing a disperse dye such as a monoazo dye containing at least one carboxylic acid group and in the presence of a tanning agent.

Notwithstanding the plethora of monoazo dyes such as these disclosed in the art to be useful for dyeing synthetic fibers, there is still a great demand for dyes which have better fastness properties, or build-up on synthetic fibers or provide more desirable and brighter shades, or which provide the optimum compromise among the desired factors.

It is an object of the present invention, therefore, to provide dyes of excellent dyeing and fastness properties and which produce bright, desirable shades.

This and other objects of the invention will become apparent from the following summary and description of preferred embodiments.

SUMMARY OF THE INVENTION

According to the present invention there are provided azo compounds, or dyes, derived from, as a coupling component, a specific class of N-carboxyalkyl- or N-carboalkoxyalkylanilines and corresponding to the general formula (I):

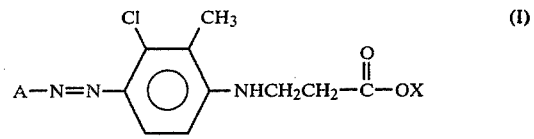

wherein

A is a benzene or naphthalene nucleus which is derived from a diazotizable aromatic amine and which may be unsubstituted or substituted with any of, for example, alkyl of 1-4 carbons; alkoxy of 1-4 carbons; nitro; cyano; halogen; trifluoromethyl; hydroxy; acyloxy; carboxy; carbalkoxy; sulfo; sulfonamido; mono and dialkylsulfonamido; acyl; benzoyl; acylamide; benzamido; or carbamyl, the nitrogen being unsubstituted or singly or doubly substituted with alkyl of 1-4 carbons; and X is hydrogen or alkyl of 1-4 carbons.

The monoazo compounds dye synthetic fibers including aromatic polyester fibers, such as polyethylene terephthalate, nylon fibers and acetate fibers and wool in strong yellow to red hues of outstanding brightness and build-up.

DESCRIPTION OF PREFERRED EMBODIMENTS

The monoazo compounds according to the present invention are derived from, as the coupling component, a specific class of N-carboxyalkyl or N-carboalkoxyalkylanilines. More particularly, the coupling component is a N-β-carboxyethyl-3-chloro-2-methylaminobenzene or alkyl ester thereof. It has been found that the 3-chloro-2-methyl-substituents are required for the outstanding properties of the azo compound. The absence of either the chloro group or the methyl group or both groups surprisingly adversely affects not only shades and affinity but other fastness properties of the corresponding azo dyes.

In the synthesis of the compounds of formula (I), the coupler may be first prepared by condensing 3-chloro-2-methylaniline with one mole of acrylic acid according to the reaction:

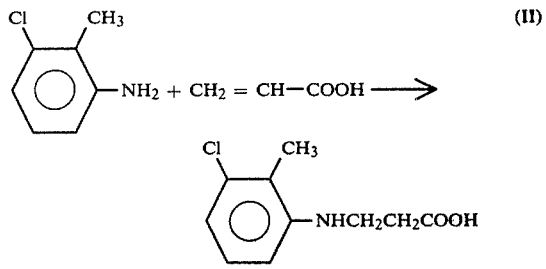

The condensation is carried out in a conventional manner employing an inert solvent such as acetic acid or water and is conveniently carried out at the reflux temperature of the solvent. Alternatively, the condensation may be carried out employing excess acrylic acid as a solvent in a manner analogous to that described in U.S. Pat. No. 3,845,080 for the condensation of aminoanthraquinone with acrylic acid. Reaction progress may be followed by TLC.

An aromatic amine, A—NH$_2$, where A is as defined above is diazotized and coupled into the coupler (II).

The azo compound obtained may be esterified, if desired, with an alcohol of the formula X'—OH, where X' is alkyl of 1-4 carbon atoms. Typically, the esterification is conveniently carried out employing the alcohol as both a reactant and a solvent and catalyzing the reaction with a strong acid such as sulfuric acid or methanesulfonic acid.

Alternatively, the coupler (III)

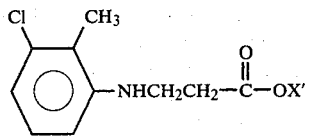

may be prepared by the direct condensation of 3-chloro-2-methylaniline with an acrylate ester of the formula

where X' is as defined above. The coupler is coupled into an appropriate diazotized aromatic amine, A—NH$_2$, in the usual way.

In the azo compounds of the general formula (I), A is an aromatic radical that may be derived from any diazotizable aromatic amine. Typically, A is a benzene or naphthalene nucleus; the benzene nucleus being unsubstituted or substituted with up to three substituents and the naphthalene nucleus being unsubstituted or substituted with up to two substituents. The substituents are independently selected from alkyl of 1-4 carbons; alkoxy of 1-4 carbons; nitro; cyano; fluorine; chlorine; bromine; trifluoromethyl; hydroxy; acyloxy (RCOO—, where R is alkyl of 1-4 carbons); sulfo; sulfamyl (NH$_2$SO$_2$—); mono or dialkylsulfonamido (NHRSO$_2$— or NR$_2$SO$_2$— where R is alkyl of 1-4 carbons); acyl (RCO—, where R is alkyl of 1-4 carbons); benzoyl; acylamide (RCONH—, where R is alkyl of 1-4 carbons); benzamido (ArCONH—, where Ar is phenyl) and carbamyl (H$_2$N—CO—), the nitrogen of which is unsubstituted or singly or doubly substituted with alkyl of 1-4 carbons. "Alkyl" or "alkoxy" as used herein designates groups wherein the alkyl is straight or branched alkyl of 1-4 carbon atoms.

Substitution in the benzene nucleus, A, relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

Azo compounds according to the present invention having particular utility in the dyeing of nylon are those of the formula (I) where A is a benzene nucleus substituted with up to three substituents independently selected from alkyl, alkoxy, halogen, trifluoromethyl, sulfo, or carboxy.

Azo compounds of the formula (I) where A is a benzene nucleus substituted with up to three substituents independently selected from alkyl, alkoxy, cyano, halogen, nitro, sulfamyl, mono, or dialkylsulfonamido or carbalkoxy are particularly suitable for dyeing aromatic polyester.

Excellent dyeings on wool can be obtained employing azo compounds according to the present invention wherein X is hydrogen and A is a benzene nucleus substituted with a carboxy or sulfo group.

It is to be noted that compounds according to the present invention wherein A is substituted with a sulfo group cannot be used to dye aromatic polyester. Additionally, those compounds wherein A is substituted with carboxy can be employed to dye aromatic polyester by carrier and pressure dyeing methods but cannot be employed to dye aromatic polyester employing thermofix methods (these methods are described more specifically below).

As stated above, an aromatic amine of the formula A—NH$_2$, where A is as defined above, is diazotized and coupled into coupler (II) and, if desired, esterified with an alcohol X'—OH, or is diazotized and coupled into the coupler (III) to prepare the azo compound (I). As suitable aromatic amines, A—NH$_2$, there may be mentioned, for example, 4-nitroaniline; 2-nitroaniline; methylanthranilate; orthoanisidine; ethyl-p-aminobenzoate; 2-amino-5-nitrobenzonitrile; p-aminoacetanilide; 3-chloro-o-toluidine; 4-nitro-3-chloro-o-toluidine; p-ethylaniline, p-butylaniline; anthranilonitrile; 2-chloro-5-trifluoromethylaniline; 4-nitro-2-chloroaniline; 4-nitro-2,6-dichloroaniline; 2,4-dimethoxy-5-chloroaniline; 2,6-dichloroaniline; 2,4-dimethoxyaniline; 1-naphthylamine; 4-amino-1-naphthalenesulfonic acid; 4-nitro-1-naphthylamine; 2,4-dichloro-1-naphthylamine; 4-methoxy-1-naphthylamine; 5-bromo-1-naphthylamine; sulfanilic acid; metanilic acid; 4-methoxymetanilic acid and 2,5-dichlorosulfanilic acid. Other aromatic amines, of course, may be employed as a starting material to prepare the azo compounds according to the invention. The choice of suitable aromatic amines within the definition of A above is believed to be limited only by economic considerations and availability.

Diazotization of the aromatic amine and coupling of the diazotized amine into coupler (II) or coupler (III) are carried out in conventional ways. Diazotization of the aromatic amine is effected by heating it (if necessary to achieve solution) in an aqueous solution of strong mineral acid such as hydrochloric acid, cooling the resulting solution to a temperature of 0°-10° C., and adding thereto a quantity of sodium nitrite slightly in excess of the stoichiometric requirement. An alternate method of diazotization involves dissolving sodium nitrite in concentrated sulfuric acid, heating to a temperature of about 60°-70° C., cooling the resulting solution to 0°-10° C. and adding thereto the aromatic amine.

The coupling reaction is carried out by adding the diazonium salt to a cold aqueous acid solution of the respective coupler. The mixture is allowed to react until the coupling is essentially complete, usually in 1-24 hours at 0° C. to room temperature and is thereafter filtered and washed with water or water containing dissolved sodium chloride. The desired azo product is thus obtained in the form of a moist cake. The product may be used in this form or it may be dried before grinding with a suitable agent to form a disperse paste or powder as described below.

The azo compound according to the present invention is used to dye synthetic fibers. As the synthetic fibers there may be mentioned nylon, for example, DuPont bulk continuous filament (BCF) Nylon 6-6, aromatic polyester, e.g., polyethylene terephthalate, and cellulose acetate fibers such as cellulose triacetate. To prepare the azo compound for application to the synthetic fiber substrates noted hereabove, it must be suitably dispersed. This may be done by any of the several well-known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additonal dispersants for powders, or water for pastes. Other materials such as preservatives, foam-control agents, and wetting agents (for powders) may be added as desired.

Dispersed pastes are made by wet milling the azo materials in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethanedisulfonate, are conveniently used. The disperse paste may be cut or standardized to a standard strength with water. The final color content of the finished paste is usually from 10 to 40% by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray-dried and micropulverized if necessary to provide the dispersed powder. The color is cut or standardized to a standard strength in a blender with a diluent, such as the same or another dispersant or dextrin. A wetting agent, such as sodium cetyl sulfate or an alkylphenoxy polyethanol may be added to aid in wetting out the product when it is placed in the dye bath. Disperse powders are usually cut or standardized to 20–50 percent by weight color content (pure color).

The dye, when added to water with or without auxiliary agents, forms a near colloidal aqueous dispersion from which aromatic polyester fiber is dyed in the conventional manner at 40°–105° C. (104°–220° F.) to give a colored fiber containing about 0.01-2 percent by weight dye (100% color basis). Alternatively, dyeing on polyester may be accomplished without a carrier at temperatures of 100°–150° C. under pressure.

The azo compounds according to the present invention containing acid groups such as sulfo and carboxy groups may be conveniently applied to nylon by dispersing the compound in the usual way and dyeing from an acid bath. Thus, for example, to dye a nylon yarn such as DuPont T-846 BCF nylon carpet yarn, an aqueous dye bath containing the fiber in a fiber to dye bath ratio of 1:30 and 3 to 6% ammonium sulfate, based on the weight of the fiber, is prepared. A disperse paste or micropulverized powder of the dye is added in an amount sufficient to provide a bath containing from 0.5 to 2.0% dye base, based on the weight of the fiber. Dyeing is carried out for 1 hour at the boil. If the dye is not completely exhausted, acetic acid may be added up to 1% based on the weight of the fiber. The fiber is then removed from the bath, rinsed with cold water and dried. The dyeings are tested for lightfastness by subjecting them to Xenon-arc fading in accordance with AATCC Colorfastness to light: Xenon-arc Lamp. Continuous Light Test No. 16E-1974, p.137, 1975 Technical Manual of the AATCC. Colorfastness to washing is determined according to AATCC Test Method No. 61-1975 (IIA), p.154, 1975 Technical Manual.

The dye may also be applied to the synthetic fibers in patterns by conventional printing methods. The printing paste can be thickened with customary thickening agents and may also contain other additives conventionally used with printing pastes. The printing paste is expediently applied to the fabric by a printing block or a roller, whereupon the printed fabric is dried and steamed at a temperature between 105° C. and 110° C. After the dyeing or printing of the fiber, it is treated with a hot aqueous soap solution, rinsed thoroughly and dried. As suitable dyeing and printing techniques there may be mentioned those described in U.S. Pat. Nos. 3,399,027; 3,399,952; 3,492,078; 3,556,709 and 3,360,656.

The dye may also be applied to aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220° C. (356°–428° F.) are used for 30 to 90 seconds. If the fabric contains cotton or viscose rayon, apart from synthetic fibers, there is little danger of damaging cellulosic portions, but if wool is present, the temperature must be kept within 180°–200° C. and the time must be reduced to 30 seconds.

The azo compounds according to the present invention when suitably dispersed show excellent dyeing and fastness properties. They dye synthetic fibers including nylon, acetate and, particularly, polyester fibers in strong yellow to red hues of outstanding brightness and build-up. Thus, for example, the azo compound of the general formula (I) wherein A is 4-nitrophenyl and X is methyl when suitably dispersed and applied to aromatic polyester fibers by the carrier method, thermofix method or pressure methods yields outstanding brilliant orange dyeings of desirable build-up, excellent lightfastness and near perfect sublimation. The compound of the invention where A is 2,6-dichloro-4-nitrophenyl and X is methyl dyes polyester fibers in attractive reddish brown shades of outstanding lightfastness and perfect sublimation. The compound (I) where A is 2,5-dichlorophenyl and X is hydrogen dyes nylon in strong attractive golden yellow hues of outstanding washfastness.

In order to evaluate the effectiveness of a particular dye for a given type of fiber, the dyed fiber is generally examined for various properties as indicated above including, for example, build-up, substantivity, light fastness, resistance of the color to sublimation, crocking, heat, and resistance to dry cleaning solvents. Specific tests for the evaluation of these important properties are described in the example that follow.

EXAMPLE I

Preparation of the Coupler

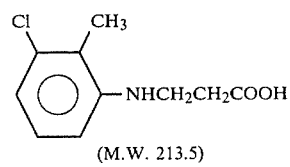

(M.W. 213.5)

To a mixture of 40 g. acrylic acid and 50 ml. water, there was added 70.5 g. 3-chloro-2-methylaniline and 5 g. Tween 20. The reaction mass was heated to 100° C. and was held at reflux until the starting material was no longer present by TLC. The reaction was complete after four hours. The reaction mixture was stirred to room temperature until a white precipitate separated. The product was filtered and the cake was covered three times with cold water, then sucked dry. It was then dried in an oven below 80° C.

Yield: 101.4 g.
Theory: 106.7 g.

EXAMPLE II

Preparation of the Coupler

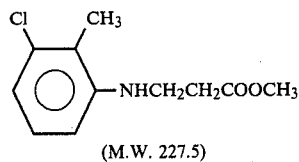

(M.W. 227.5)

To a mixture of 28.3 g. 3-chloro-2-methylaniline in 25 g. glacial acetic acid, there was added 22 g. methyl acrylate, 1.0 g. cuprous chloride and 0.1 g. hydroquinone. The reaction mass was heated to 95° C. and was held at 95°–100° C. for 12 hours. At the end of the heating period, no starting material could be detected by TLC. The reaction mixture was stirred to room temperature and was used, without isolation, as a coupler.

EXAMPLE III

Preparation of the Azo Compound

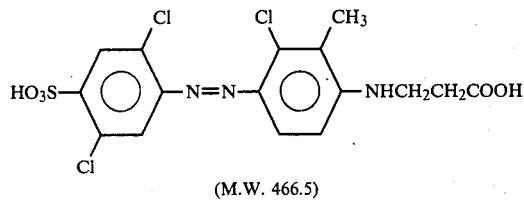

(M.W. 466.5)

A mixture of 66.6 g. moist 2,5-dichlorosulfanilic acid (dry test 36.3%), 300 ml. water, 5.5 g. sodium carbonate and 7 g. sodium nitrite was stirred to complete solution. The clear solution was then drowned into 100 g. ice, 40 g. 32% hydrochloric acid, 1 g. Tween 20 and 0.1 g. sodium nitrite. The diazo solution was stirred at 5°–10° C. for one half hour, and excess nitrous acid was destroyed with a few drops of sulfamic acid solution. To the clear diazo solution, there was added a solution of 21.4 g. β-(3-chloro-2-methyl(anilino)propionic acid obtained in Example I in 100 ml. water and 22.6 g. 32% hydrochloric acid. After the coupling was complete, the mixture was filtered and the cake was dispersed into a 15% color content paste.

Yield: 128.7 g. moist cake/34% dry test or 43.8 g. (100% dry weight)
Theory: 46.7 g.

The dispersed product dyed nylon in brilliant orange shades of excellent depth and outstanding lightfastness. There was no break at 20 exposure hours under Xenon light.

EXAMPLE IV

Preparation of the Azo Compound

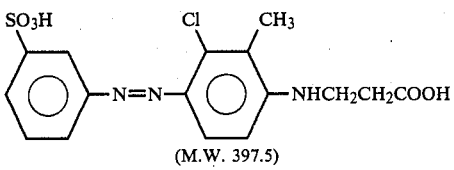

(M.W. 397.5)

Following the procedure of Example III and substituting for the 2,5-dichlorosulfanilic acid with an equivalent amount of metanilic acid, the above product was obtained in 84.7% of the theoretical yield. The moist cake was dispersed into 10% color content paste. When dyed on nylon, it produced brilliant yellow shades of excellent strength and outstanding lightfastness. No break was noticed at 20 exposure hours under Xenon light.

EXAMPLE V

Preparation of the Azo Compound

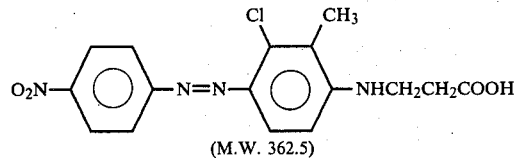

(M.W. 362.5)

A fine slurry of 13.8 g. p-nitroaniline in 200 ml. water, 30 g. 32% hydrochloric acid and 2.5 g. Tween 20 was diazotized at 0° C. with a solution of 7.2 g. sodium nitrite in 50 ml. water. The diazo solution was stirred at 0°–5° C. for one and one half hours and excess nitrous acid was destroyed with a few drops of sulfamic acid. To the clear diazo there was added at 0° C. a solution of 21.4 g. β-(3-chloro-2-methylanilino)propionic acid in 100 ml. water and 22.6 g. 32% hydrochloric acid. The coupling mass was stirred to room temperature overnight. The mixture was filtered and the cake was washed neutral with water.

Yield: 184.7 g. moist cake/22% dry test or 40.6 g. (100% dry weight)

The cake was dispersed into a 15% color content paste. It dyed nylon in attractive burnt orange shade of outstanding washfastness and very good lightfastness. It only showed a very slight break at 20 exposure hours under Xenon light.

EXAMPLE VI

Preparation of the Azo Compound

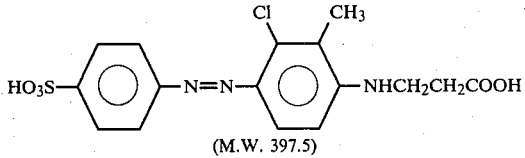

(M.W. 397.5)

Following the procedure of Example III, and substituting sulfanilic acid for the 2,5-dichlorosulfanilic acid (in an equivalent amount), the above product was obtained in 86.9% of the theoretical yield. The product was dried and micropulverized with an equal weight of sugar. The powder dyed nylon in brilliant golden yellow shades of

EXAMPLE VII

Preparation of the Azo Compound

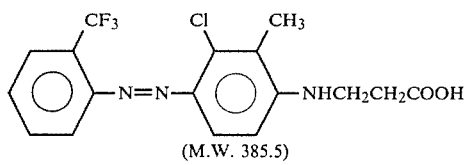

(M.W. 385.5)

A solution of 24.2 g. 2-aminobenzotrifluoride in 100 ml. water, 85 g. 32% hydrochloric acid and 2 g. Tween 20 was diazotized by adding dropwise at 0°–3° C. a solution of 10.5 g. sodium nitrite in 75 ml. water. The diazo solution was stirred at 0° C. for two hours. Excess nitrous acid was then destroyed with a few drops of sulfamic acid solution and the diazo solution was clarified. To the clear diazo solution, there was added at 0° C. a solution of 32 g. β-(3-chloro-2-methylanilino)propionic acid in 100 ml. water and 33 g. 32% hydrochloric acid. The coupling mixture was stirred to room temperature overnight. The product was filtered and the cake was washed neutral with water. The moist cake was dispersed into a 15% color content paste.

Yield: 153.7 g. moist cake/34% dry test or 52.3 g. (100% dry weight)

Theory: 57.8 g.

The dispersed product dyed nylon in bright yellowish orange shades of excellent strength, washfastness and lightfastness.

EXAMPLE VIII

Preparation of the Azo Compound

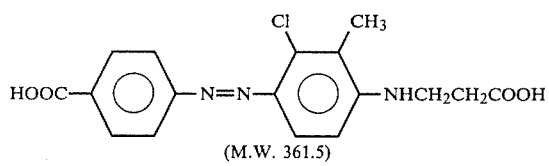

(M.W. 361.5)

A mixture of 13.7 g. 4-aminobenzoic acid, 200 ml. water and 40 g. 32% hydrochloric acid was heated to 45° C. and stirred until a clear solution was obtained. This clear solution was drowned into 1000 ml. water and 500 g. ice. There was added at 0°–5° C. a solution of 7.1 g. sodium nitrite dissolved in 100 ml. water. The diazo solution was stirred at 0°–5° C. for one hour and excess nitrous acid was destroyed with a few drops of sulfamic acid solution. To the clear diazo was added 21.4 g. β-(3-chloro-2-methylanilino)propionic acid obtained in Example I dissolved in 100 ml. water and 22.6 g. 32% hydrochloric acid. The coupling reaction was then forced to completion by adding 50 g. sodium acetate dissolved in 250 ml. water. When coupling was completed the product was isolated by filtration and the cake was dried and dispersed to yield a 10% color content paste.

Yield: 32 g. dry powder

Theory: 36.1 g.

The dispersed paste dyed nylon in bright reddish yellow shades with excellent washfastness and superior lightfastness. When tested under Xenon light there was no break at 20 hours of exposure. The product also dyed wool in strong orange hue with good color value and build-up. Lightfastness test did not show any break at 20 exposure hours under Carbon or Xenon lights.

EXAMPLE IX

Preparation of the Azo Compound

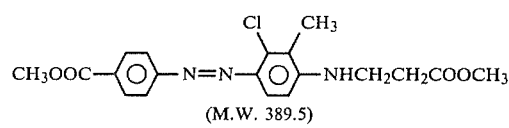

(M.W. 389.5)

To a mixture of 110 g. absolute methanol and 5 g. methane sulfonic acid there was added 18.1 g. 4-(4-phenylazobenzoic acid)-β-(3-chloro-2-methylanilino)-propionic acid obtained in Example VIII. The reaction mixture was heated to 65° C. and held at reflux until no starting material was present by TLC. The reaction was complete after twenty hours. The reaction mass was cooled to room temperature and drowned into a solution of 6 g. sodium bicarbonate and 500 ml. water. The mixture was filtered, washed alkaline free to Brilliant Yellow paper and dried. The dry powder was dispersed into a 10% color content paste.

Yield: 17.6 g. dry powder

Theory: 19.4 g.

The dispersed product dyed polyester fabric in bright golden yellow shades of good sublimation and outstanding lightfastness. There was no break after twenty hours of exposure to Carbon light.

EXAMPLE X

Preparation of the Azo Compound

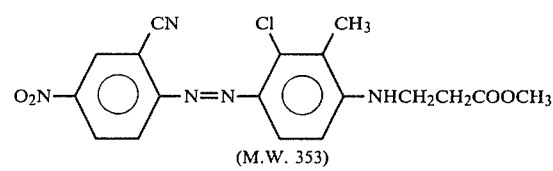

(M.W. 353)

To 100 g. 66° Baume sulfuric acid, at 10°–15° C., there was added 7.2 g. sodium nitrite. The mixture was heated to 65° C. and held at 75°–70° C. until a complete solution was obtained. The mixture was cooled to 0° C. and there was added at 0°–5° C. a solution of 16.5 g. propionic acid and 83.5 g. acetic acid. There was then added at 0° C. 16.3 g. 4-nitro-2-cyanoaniline. The mass was stirred two hours at 0°–5° C. The diazo mass was drowned into a solution of 15 g. 32% hydrochloric acid, 1500 ml. water, 5 ml. 20% sulfamic acid solution, 1 g. Tween 20 and 22.7 g. methyl[β-(3-chloro-2-methylanilino)]propionate obtained in Example II. Coupling was rapid. The mixture was filtered, cake was washed neutral to Congo Red paper and dispersed as a 10% color content paste.

Yield: 124.5 g. wet cake/26% dry test or 32.4 g. (100% dry weight)=91.7% of theory Theory: 35.3 g.

The dispersed paste dyed polyester fabrics in yellowish red shades with good sublimation properties and excellent lightfastness. There was no noticeable break after 20 hours exposure to Xenon light.

EXAMPLE XI

Preparation of the Azo Compound

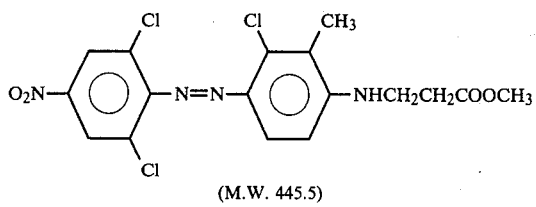

(M.W. 445.5)

To 45 g. 66° Baume sulfuric acid, at 10°–15° C., there was added 3.5 g. sodium nitrite. The mixture was heated to 65° C. and held at 65°–70° C. until a complete solution was obtained. The mass was cooled to 20° C. and at 20°–30° C. there was added 10.4 g. 4-Nitro-2,6-dichloroaniline. The diazo solution was then drowned into a solution of 8.4 g. 32% hydrochloric acid, 1000 ml. water, 3 ml. sulfamic acid solution, and 10.7 g. β-(3-chloro-2-methylanilino)propionic acid prepared in Example I. Coupling was rapid. The mixture was filtered, washed neutral to Congo Red paper and dried. Esterification was then carried out in four hours using 35.0 ml. absolute methanol, 5.3 g. methane sulfonic acid and following the procedure of Example IX. The wet cake was dried and dispersed as a 10% color content paste.

Yield: 20.2 g. dry powder = 90.6% of theory
Theory: 22.3 g.

EXAMPLE XII

Dyeing of Polyester

An aqueous dye bath containing 10% Marcron (a commercially available phenolic dye carrier) and 1% monosodium phosphate as a buffering agent was prepared. Type 54, Style 755, Dacron polyester fabric was treated in a bath at 120° F. for 10 minutes, the fabric to water dye bath ratio being 1:40. A disperse paste of the dye of Example XI was added in an amount sufficient to provide a bath containing 0.4 percent dye base based on the weight of polyester fiber. Dyeing was continued for one hour at 205° F. and the fabric was removed from the bath, rinsed and dried. Sample dyeings were tested for sublimation according to standard AATCC Color Fastness to Dry Heat (Sublimation) Test No. 117-1974T, page 119 of the 1974 Technical Manual of the American Association of Textile Chemists and Colorists (AATCC). The dyed fabric was placed between a sandwich of undyed Dacron polyester fabric and heat was applied for 30 seconds. Sublimation tests were made at 350° C. and 400° F. on goods as described above. A sublimation rating of (−5) was established, indicating outstanding resistance to sublimation. The dyeing was characterized by a bright burnt orange hue with superior lightfastness. The dyeings showed no break at 20 hours exposure under Carbon light. Similar excellent results were obtained when the dye was applied to the fabric by the Thermosol process and then tested for sublimation as described above. The dyeings were also tested for lightfastness by subjecting them to carbon are fading in accordance with AATCC Color Fastness to Light Carbon Arc Lamp, Continuous Light Test No. 16A-1974, page 124, 1974 Technical Manual of the AATCC. The dyeings showed no break at 20 hours exposure indicating very good fastness to light.

EXAMPLE XIII

Preparation of the Azo Compound

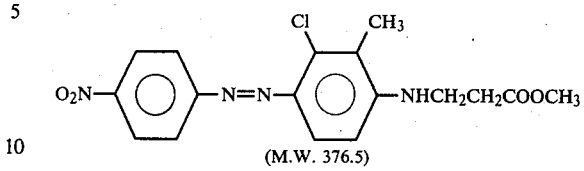

(M.W. 376.5)

To 18.1 g. of dried product prepared according to Example V there was added 30 g. absolute methanol and 4.8 g. methane sulfonic acid. The mass was heated to 65° C. and allowed to reflux five hours. The mixture was then cooled to room temperature and drowned into a solution consisting of 15 g. sodium bicarbonate and 500 ml. water. The mixture was filtered, washed neutral to brilliant yellow paper and dried. The powder was dispersed as a 10% color content paste.

Yield: 17.6 g. dry powder (93.5% of theory)
Theory: 18.8 g.

The dispersed paste dyed polyester fabric in attractive orange shades with excellent sublimation properties at 350° F. and superior lightfastness properties. There was no break when exposed to Carbon light for 20 hours.

EXAMPLE XIV

Preparation of the Azo Compound

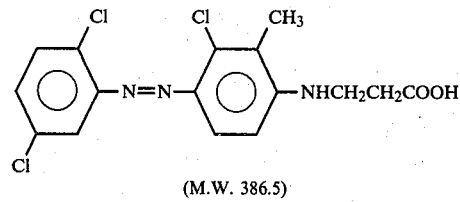

(M.W. 386.5)

Following the procedure outlined in Example V and substituting 16.4 g. 2,5-dichloroaniline for 13.8 g. p-nitroaniline, the above product was obtained in 83.4% of the expected yield. The wet cake was dispersed as a 10% color content paste. The product dyed nylon in desirable golden yellow shades with superior wash-fastness properties and excellent lightfastness. There was no noticeable break after being exposed to Carbon light for 20 hours.

EXAMPLE XV

Preparation of the Azo Compound

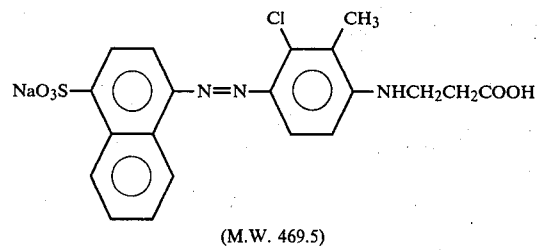

(M.W. 469.5)

A mixture of 24.5 g. 4-amino-1-naphthalene sulfonic acid sodium salt, 100 ml. water and 7 g. sodium nitrite was drowned into 100 g. ice, 40 g. 32% hydrochloric acid, 0.1 g. sodium nitrite and 1 g. Tween 20. The bright yellow precipitate formed was stirred at 0° C. for 20 minutes and excess nitrous acid was destroyed with a few drops of sulfamic acid solution. To this diazo slurry, there was added at 0° C. a solution of 21.4 g. β-(3-chloro-2-methylanilino)propionic acid dissolved in 100 ml. water and 22.6 g. 32% hydrochloric acid. pH of the coupling mixture was adjusted to 5 by adding 145 ml 20% soda ash solution. When the coupling was complete, the pH was lowered to 1 by adding 21 ml. 32% hydrochloric acid. The mixture was filtered and the cake was dried in an oven.

Yield: 35.7 g.

Theory: 46.9 g.

The product dyed nylon in bright reddish orange shades of excellent wash fastness and good lightfastness. It only showed a very slight break at 20 exposure hours under Xenon light.

EXAMPLES XVI-XXVII

To establish the effect of the 3-chloro and 2-methyl substituents of the coupling component of the azo compound (I) according to the present invention, a series of azo compounds as shown in Table I, read in conjunction with the following general formula, were prepared according to the procedures outlined in the foregoing examples and dispersed and applied to aromatic polyester (Dacron, Type 54, Style 755). The shade or hue, color value, sublimation and lightfastness of the resultant dyeings, evaluated according to the methods described in the foregoing examples are shown in Table I.

TABLE I

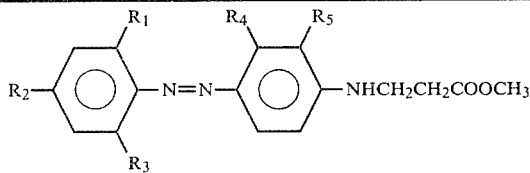

| Ex. | $R_1$ | $R_2$ | $R_3$ | $R_4$ | $R_5$ | Shade or Hue | Color Value | Sublimation | Light Fastness |
|---|---|---|---|---|---|---|---|---|---|
| XVI | H | $NO_2$ | H | Cl | $CH_3$ | brilliant orange | excellent | good | excellent |
| XVII | H | $NO_2$ | H | Cl | H | orange | weak | good | poor |
| XVIII | H | $NO_2$ | H | H | $CH_3$ | orange | good | fair | poor |
| XIX | H | $NO_2$ | H | H | H | orange | good | fair | poor |
| XX | Cl | $NO_2$ | Cl | Cl | $CH_3$ | brown | excellent | excellent | excellent |
| XXI | Cl | $NO_2$ | Cl | Cl | H | pale beige | poor | excellent | poor |
| XXII | Cl | $NO_2$ | Cl | H | $CH_3$ | pale beige | no color value | — | — |
| XXIII | Cl | $NO_2$ | Cl | H | H | pale beige | poor | excellent | poor |
| XXIV | CN | $NO_2$ | H | Cl | $CH_3$ | yellowish red | excellent | excellent | good |
| XXV | CN | $NO_2$ | H | Cl | H | reddish brown | good | excellent | poor |
| XXVI | CN | $NO_2$ | H | H | $CH_3$ | bluish red | excellent | fair | poor |
| XXVII | CN | $NO_2$ | H | H | H | brown | excellent | poor | poor |

It can be seen that the removal of the chloro or methyl groups, or both groups, adversely affects not only shades and dyeing affinity, but also other fastness properties.

EXAMPLES XXVIII-XXX

Azo compounds as shown in Table II, read in conjunction with the following general formula, were prepared according to the procedures outlined in the foregoing examples and applied to DuPont T-846 BCF nylon carpet yarn. The properties of the resultant dyeings are shown in Table II.

TABLE II

HOOC—⟨⟩—N=N—⟨⟩—NHCH$_2$CH$_2$COOH
with $R_1$, $R_2$ substituents on second ring

| Ex. | $R_1$ | $R_2$ | Shade or Hue | Color Value | Washfastness 120° F. | Lightfastness "Xenon" |
|---|---|---|---|---|---|---|
| XXVIII | Cl | $CH_3$ | brilliant reddish yellow | excellent | excellent | no break at 20 exposure hours |
| XXIX | Cl | H | dull & weak reddish yellow | poor | fair | distinct break at 20 exposure hours |
| XXX | H | $CH_3$ | yellowish orange | good | fair | distinct break at 20 exposure hours |

Although the invention has been described in conjunction with the foregoing examples and preferred embodiments, it is not to be limited thereto, but instead includes all those embodiments within the scope and spirit of the appended claims.

What is claimed is:

1. The azo compound represented by the formula:

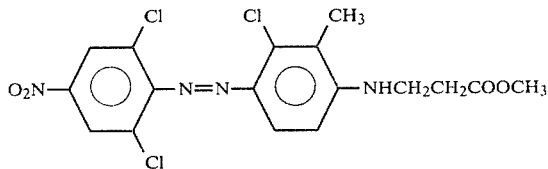

* * * * *